US012626213B2

(12) United States Patent (10) Patent No.: US 12,626,213 B2

Jones et al. (45) Date of Patent: May 12, 2026

(54) DIGITAL STAMPS

(71) Applicant: UNITED STATES POSTAL SERVICE, Washington, DC (US)

(72) Inventors: Anthony Cramer Jones, Brooklyn, NY (US); Dominik Heinrich, New York, NY (US); Caspar Serge Ouvaroff, New York, NY (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 0 days.

(21) Appl. No.: 18/936,344

(22) Filed: Nov. 4, 2024

(65) Prior Publication Data

US 2025/0131367 A1 Apr. 24, 2025

Related U.S. Application Data

(63) Continuation of application No. 18/296,017, filed on Apr. 5, 2023, now Pat. No. 12,141,738, which is a (Continued)

(51) Int. Cl.
G06Q 10/0832 (2023.01)
G06Q 20/32 (2012.01)
(Continued)

(52) U.S. Cl.
CPC ..... G06Q 10/0832 (2013.01); G06Q 20/3223 (2013.01); G06Q 50/60 (2024.01); G07B 17/00508 (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS 6,788,203 B1 9/2004 Roxbury et al.
7,240,036 B1 7/2007 Mamdani et al.
(Continued)

FOREIGN PATENT DOCUMENTS

CN 205433230 U 8/2016
JP 2004083148 A 3/2004

OTHER PUBLICATIONS

Cullen, Mark, Leon Pintsov, and Brian Romansky. "Reading encrypted postal indicia." Proceedings of 3rd International Conference on Document Analysis and Recognition. vol. 2. IEEE, 1995. (Year: 1995).*

(Continued)

*Primary Examiner* — Emmett K. Walsh
(74) *Attorney, Agent, or Firm* — MH2 Technology Law Group, L.L.P

(57) ABSTRACT

Systems, methods, interface devices, and media for the delivery of physical items using a digital stamp. Various implementations include operations such as receiving a request from a user to deliver an item to a destination using a digital stamp, wherein the item includes destination information and lacks any physical indicator that the delivery fee for the item has been paid or will be paid; receiving a destination address from the user; presenting a delivery fee for the item; and causing the generation of a digital stamp using the destination address and the delivery fee, which may be correlated with the item.

20 Claims, 7 Drawing Sheets

Related U.S. Application Data continuation of application No. 17/752,121, filed on May 24, 2022, now Pat. No. 11,625,666, which is a continuation of application No. 15/850,914, filed on Dec. 21, 2017, now Pat. No. 11,348,056.

(51) Int. Cl.
  *G06Q 50/60* (2024.01)
  *G07B 17/00* (2006.01)

(56) References Cited

U.S. PATENT DOCUMENTS

| | | | |
|---|---|---|---|
| 9,299,053 | B2 | 3/2016 | Gazdzinski et al. |
| 9,471,559 | B2 | 10/2016 | Castelli et al. |
| 9,805,329 | B1 | 10/2017 | Biswas |
| 2002/0032573 | A1 | 3/2002 | Williams et al. |
| 2002/0165729 | A1 | 11/2002 | Kuebert et al. |
| 2003/0182155 | A1 | 9/2003 | Nitzan et al. |
| 2004/0064326 | A1 | 4/2004 | Vaghi |
| 2006/0028398 | A1 | 2/2006 | Willmore |
| 2006/0208066 | A1 | 9/2006 | Finn et al. |
| 2013/0198300 | A1 | 8/2013 | Briggman et al. |
| 2013/0218721 | A1 | 8/2013 | Borhan et al. |
| 2014/0136013 | A1 | 5/2014 | Wolverton et al. |
| 2014/0244536 | A1 | 8/2014 | Far-Hadian |
| 2015/0371468 | A1 | 12/2015 | Mackin et al. |
| 2016/0042320 | A1 | 2/2016 | Dearing et al. |
| 2016/0049152 | A1 | 2/2016 | Kennewick et al. |
| 2016/0072915 | A1 | 3/2016 | Decanne |
| 2016/0300187 | A1 | 10/2016 | Kashi et al. |
| 2017/0061372 | A1 | 3/2017 | Agarwal |
| 2017/0132565 | A1 | 5/2017 | Beadles et al. |
| 2017/0228367 | A1 | 8/2017 | Pasupalak et al. |
| 2017/0323371 | A1 | 11/2017 | Lampert et al. |
| 2017/0352122 | A1 | 12/2017 | Markarian |
| 2017/0357937 | A1 | 12/2017 | Edens et al. |
| 2018/0060829 | A1 | 3/2018 | Gillen |
| 2019/0033856 | A1 | 1/2019 | Ferguson et al. |
| 2019/0197462 | A1 | 6/2019 | Jones et al. |
| 2019/0197649 | A1 | 6/2019 | Jones et al. |
| 2022/0284388 | A1 | 9/2022 | Jones et al. |
| 2023/0252398 | A1 | 8/2023 | Jones et al. |

OTHER PUBLICATIONS

Cullen et al., "Reading Encrypted Postal Indicia", Proceedings of 3rd International Conference on Document Analysis and Recognition (Year: 1995), pp. 1018-1023.

US Office Action issued in U.S. Appl. No. 15/850,432 on Mar. 30, 2020, 35 pages.

KMJ, Red Shipping container of Lorenzo Shipping Corporation, https://en.wikipedia.org/wiki/Intermodal_container#/media/File:Container_01_KMJ.jpg, Jul. 19, 2004, pp. 1-2. (Year: 2004).

US Office Action issued in U.S. Appl. No. 15/850,432 on Feb. 9, 2022, 33 pages.

US Office Action issued in U.S. Appl. No. 15/850,432 on Jun. 7, 2022, 35 pages.

US Office Action issued in U.S. Appl. No. 15/850,432 on Mar. 9, 2023, 39 pages.

US Office Action issued in U.S. Appl. No. 15/850,432 on Oct. 6, 2022, 33 pages.

US Office Action issued in U.S. Appl. No. 15/850,432 on Sep. 2, 2021, 39 pages.

Pooyan, P., Non-Final Office Action issued in U.S. Appl. No. 15/850,432 on Nov. 29, 2019, pp. 1-33.

Corrected Notice of Allowability issued in U.S. Appl. No. 15/850,914 on Feb. 9, 2022, 3 pages.

Notice of Allowance issued in U.S. Appl. No. 15/850,914 on Jan. 28, 2022, 12 pages.

US Office Action issued in U.S. Appl. No. 15/850,914 on Jan. 31, 2020, 40 pages.

US Office Action issued in U.S. Appl. No. 15/850,914 on Mar. 9, 2021, 16 pages.

US Office Action issued in corresponding U.S. Appl. No. 15/850,914 on May 20, 2020, 44 pages.

US Office Action issued in U.S. Appl. No. 15/850,914 on Oct. 23, 2020, 28 pages.

US Office Action issued in U.S. Appl. No. 15/850,914 on Sep. 20, 2021, 12 pages.

Non-Final Office Action issued in U.S. Appl. No. 15/850,914 on Oct. 21, 2019, pp. 1-41.

US Office Action issued in U.S. Appl. No. 15/850,432 on Jul. 23, 2020, 36 pages.

Office Action issued in U.S. Appl. No. 18/296,017 on Oct. 13, 2023, 60 pages.

Office Action issued in U.S. Appl. No. 18/296,017 on Mar. 12, 2024, 18 pages.

\* cited by examiner

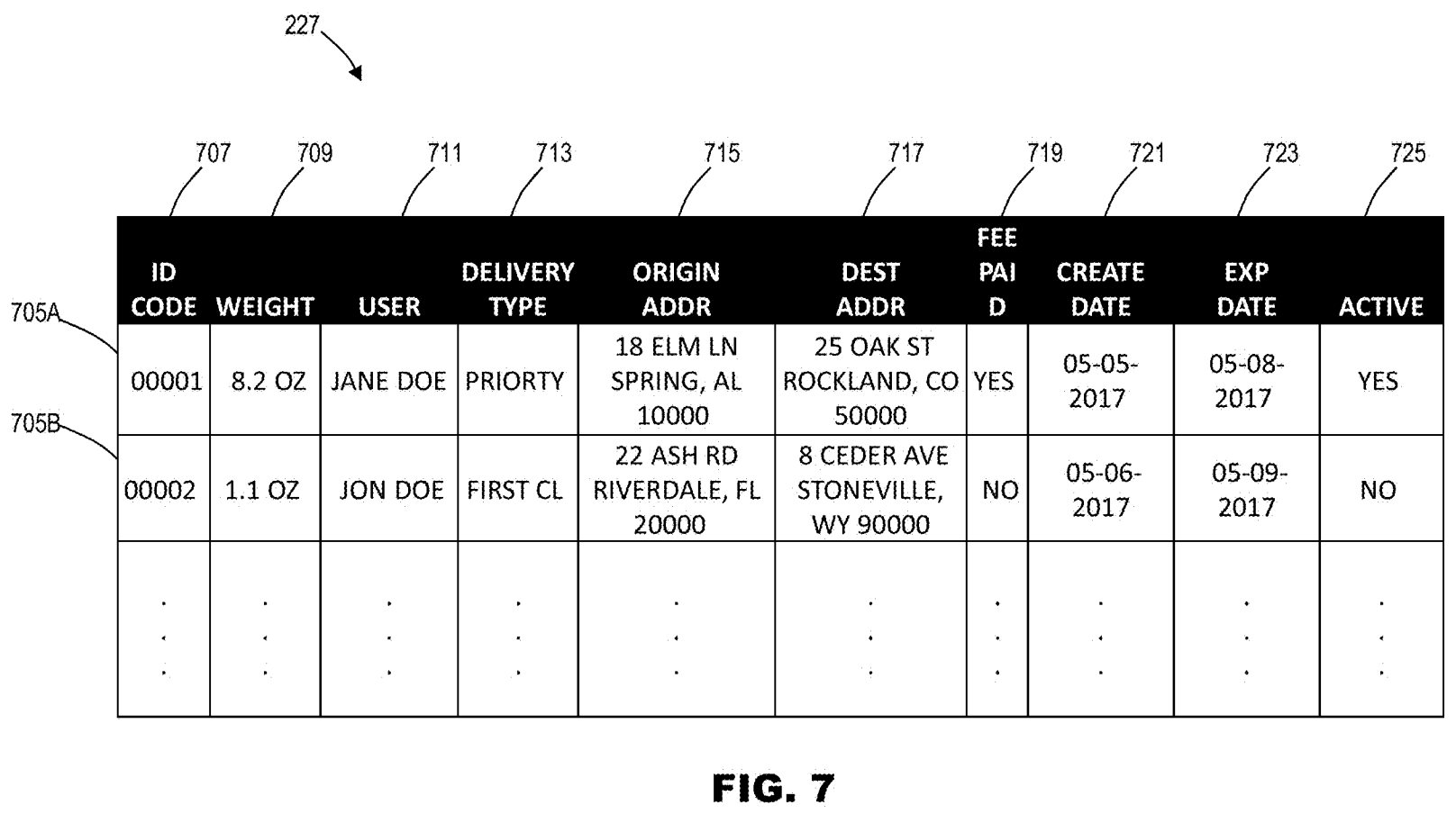

| ID CODE | WEIGHT | USER | DELIVERY TYPE | ORIGIN ADDR | DEST ADDR | FEE PAID | CREATE DATE | EXP DATE | ACTIVE |
|---|---|---|---|---|---|---|---|---|---|
| 00001 | 8.2 OZ | JANE DOE | PRIORTY | 18 ELM LN SPRING, AL 10000 | 25 OAK ST ROCKLAND, CO 50000 | YES | 05-05-2017 | 05-08-2017 | YES |
| 00002 | 1.1 OZ | JON DOE | FIRST CL | 22 ASH RD RIVERDALE, FL 20000 | 8 CEDER AVE STONEVILLE, WY 90000 | NO | 05-06-2017 | 05-09-2017 | NO |
| . . . | . . . | . . . | . . . | . . . | . . . | . . . | . . . | . . . | . . . |

FIG. 7

DIGITAL STAMPS

CROSS-REFERENCE TO RELATED APPLICATIONS

This application is a continuation of copending U.S. application Ser. No. 18/296,017 filed on 5 Apr. 2023 (now U.S. Pat. No. 12,141,738), which is continuation of copending U.S. application Ser. No. 17/752,121 filed on 24 May 2022 (now U.S. Pat. No. 11,625,666), which is a continuation of copending U.S. application Ser. No. 15/850,914 filed on 21 Dec. 2017 (now U.S. Pat. No. 11,348,056), which are hereby incorporated by reference in their entirety.

BACKGROUND

Electronic mail and instant messaging have become the primary means to communicate written messages and visual information. Physical items (e.g., letters, postcards, and packages) continue to be carried and delivered by delivery and courier services, such as the United States Postal Service ("USPS"). Use of such services can be inconvenient in comparison to sending electronic mail and instant messaging. For example, the delivery fee can be prepaid by an individual requesting delivery of an item (i.e., "the sender"). In such situations, the sender may obtain a stamp (e.g., a postage stamp) or other physical indicia (e.g., a shipping label) indicating that the delivery fee has been paid, and affix it to an outside surface of the item, so that the delivery service can recognize that the delivery fee has been paid or will be paid. If a delivery service receives an item that lacks any stamp(s) or other physical indicia indicating payment of the delivery fee, then the delivery service may return the item to the sender instead of delivering it to the addressee.

The delivery fee for different items may vary based on, for example, the type of delivery requested (e.g., priority delivery, first class delivery, overnight delivery, parcel post delivery, etc.) and the weight of the item. Thus, prior to dropping an item off for collection at a collection box (e.g., blue box, postbox, mailbox, letter box, or drop box), the sender may wish to know the delivery fee (e.g., postage) for the item. And, even if the sender knows the delivery fee, they may not have the stamps or other physical indicia on hand. Obtaining stamps or other physical indicia can be inconvenient for a sender who simply desires to drop off an item at a collection box. In some situations, the sender may obtain the stamps or other physical shipping indicia indicating payment of the delivery fee by traveling to a retail location of a delivery service (e.g., a post office). In that situation, the sender can simply drop off the package and pay the delivery fee at the retail location, instead of using a collection box as the sender originally intended. In other situations, the sender can avoid traveling to the retail location by obtaining stamps or shipping labels online via the Internet. For example, the sender can obtain postage stamps from services such as USPS.COM or STAMPS.COM™, which is a business partner of the USPS. Such Internet transactions can be inconvenient because a typical Internet purchase can involve numerous steps, including locating, accessing, and browsing a virtual storefront; and completing a purchase with a secure payment system. Additional steps may be taken if the user has forgotten their security credentials for the online store or the secure payment system.

For the reasons above, it would be desirable to provide more convenient methods and systems for sending and paying the delivery fee for physical items using a delivery service.

SUMMARY

The present disclosure provides systems, interface devices, methods, and computer-readable media for the delivery of physical items using digital stamps. Implementations in accordance with the present disclosure include hardware for and/or perform functions and operations that include: receiving, by a computerized user interface device, a request from a user to deliver a physical item to a destination using a digital stamp, wherein the physical item includes a written destination address; receiving, from the user, destination information corresponding to the written destination address; receiving a weight of the physical item; presenting to the user a delivery fee for the physical item that is based on the destination information and the weight of the physical item; and receiving an acceptance of the delivery fee; and prompting the user to place the physical item at a collection location. In various embodiments, in response to the acceptance, a delivery service computing system may generate a record for the digital stamp using the destination information and the delivery fee and correlate the record with the physical item. The physical item lacks any physical indicator that the delivery fee for the physical item has been paid or will be paid.

In various implementations, the operations may further include receiving the request from the user to deliver the physical item comprises receiving a spoken request from the user; and receiving destination information comprises receiving spoken destination information from the user.

In various implementations, presenting the delivery fee for the physical item may include audibly providing the delivery fee using speech generation implemented by the user interface device.

In some implementations, the physical item may include a written origin address, and the operations may further include receiving, by the computerized user interface device and from the user, origin information corresponding to the written origin address. In such implementations, the delivery fee for the physical item may be based on the destination information, the origin information, and the weight of the physical item, and the delivery service computing system may generate the record for the digital stamp using the destination information, the origin information, and the delivery fee.

In some implementations, the record for the digital stamp may also include the weight of the physical item.

In some implementations, presenting the delivery fee for the physical item may include presenting to the user a plurality of delivery service types and a corresponding delivery fee for a delivery service type, and receiving the acceptance of the delivery fee may include receiving, from the user, the acceptance of one delivery service type and the corresponding delivery fee from among the plurality of delivery service types.

In some implementations, receiving the weight of the physical item may include receiving the weight from a scale that is operably connected to the computerized user interface device.

In some implementations, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system for creating and using an electronic digital stamp record. The system includes a user interface including a processor executing instructions to perform operations may include receiving a request from a user to deliver a physical item to a destination using the electronic digital stamp record, where the physical item includes a written destination address, receiving destination information corresponding to the written destination address, presenting to the user a delivery fee for the physical item that is computed based on the destination information, receiving an acceptance of the delivery fee, and prompting the user to place the physical item at a collection location. The system also includes a processor executing instructions to perform operations may include generating and storing the electronic digital stamp record using the destination information and the delivery fee, obtaining an image of the physical item including the destination information, determining, based on the image, that the physical item lacks any physical indicator that the delivery fee for the physical item has been paid or will be paid, accessing the electronic digital stamp record, correlating the electronic digital stamp record with the physical item, where the electronic digital stamp record includes the destination information, the delivery fee, a user name, and an indicator of whether a digital stamp associated with the electronic digital stamp record is active, and directing the physical item for delivery according to the destination information when the electronic digital stamp correlates to the physical item, the electronic digital stamp is active, and the delivery fee has been paid. Other embodiments of this aspect include corresponding computer systems, apparatus, and computer programs recorded on one or more computer storage devices, each configured to perform the actions of the methods.

Some implementations may include one or more of the following features. Receiving the request from the user to deliver the physical item may include receiving a spoken request from the user, and receiving the destination information may include receiving spoken destination information from the user. Presenting, to the user, the delivery fee for the physical item may include audibly presenting the delivery fee using automated speech generation. The physical item may include a written origin address, where the operations further include receiving origin information corresponding to the written origin address, computing the delivery fee for the physical item based on the destination information, the origin information, and a weight of the physical item, and generating the electronic digital stamp record using the destination information, the origin information, and the delivery fee. The electronic digital stamp record may include the weight of the physical item. Presenting the delivery fee for the physical item may include presenting to the user a plurality of delivery service types and a corresponding delivery fee for the delivery service type, where receiving the acceptance of the delivery fee may include receiving, from the user, the acceptance of one delivery service type and the corresponding delivery fee from among the plurality of delivery service types. The operations further may include receiving a weight of the physical item from a scale that is operably connected to the system. Implementations of the described techniques may include hardware, a method or process, or computer software on a computer-accessible medium.

In some implementations, one general aspect includes a computer implemented method for creating and using an electronic digital stamp record. The computer implemented method includes receiving a request from a user to deliver a physical item to a destination using the electronic digital stamp record, where the physical item includes a written destination address. The method also includes receiving destination information corresponding to the written destination address, presenting, to the user, a delivery fee for the physical item that is computed based on the destination information, receiving an acceptance of the delivery fee, prompting the user to place the physical item at a collection location, generating and storing the electronic digital stamp record using destination information and the delivery fee, obtaining an image of the physical item including the destination information, determining, based on the image, that the physical item lacks any physical indicator that the delivery fee for the physical item has been paid or will be paid, accessing the electronic digital stamp record, correlating the electronic digital stamp record with the physical item, where the electronic digital stamp record includes the destination information, the delivery fee, a user name, and an indicator of whether a digital stamp associated with the electronic digital stamp record is active, and directing the physical item for delivery according to the destination information when the electronic digital stamp correlates to the physical item, the electronic digital stamp is active, and the delivery fee has been paid. Other embodiments of this aspect include corresponding computer systems, apparatus, and computer programs recorded on one or more computer storage devices, each configured to perform the actions of the methods.

Some implementations may include one or more of the following features. Receiving the request from the user to deliver the physical item may include receiving a spoken request from the user, and receiving the destination information may include receiving spoken destination information from the user. Presenting, to the user, the delivery fee for the physical item may include audibly providing the delivery fee using automated speech generation. The physical item includes a written origin address, and may include receiving origin information corresponding to the written origin address, computing the delivery fee for the physical item based on the destination information, the origin information, and a weight of the physical item, and generating the electronic digital stamp record using the destination information, the origin information, and the delivery fee. The electronic digital stamp record may include the weight of the physical item. Presenting the delivery fee for the physical item may include presenting to the user a plurality of delivery service types and a corresponding delivery fee for the delivery service type, where receiving the acceptance of the delivery fee may include receiving, from the user, the acceptance of one delivery service type and the corresponding delivery fee from among the plurality of delivery service types. The method may include receiving a weight of the physical item from a scale. Implementations of the described techniques may include hardware, a method or process, or computer software on a computer-accessible medium.

In some implementations, one general aspect includes a non-transitory computer readable media including instructions for creating and using an electronic digital stamp record, wherein the instructions, when executed by a processor, perform operations comprising receiving a request from a user to deliver a physical item to a destination using the electronic digital stamp record, where the physical item includes a written destination address, receiving destination information corresponding to the written destination address, presenting, to the user, a delivery fee for the physical item that is computed based on the destination information, receiving an acceptance of the delivery fee, prompting the user to place the physical item at a collection location, generating and storing the electronic digital stamp record using the destination information and the delivery fee, obtaining an image of the physical item including the destination information, determining, based on the image, that the physical item lacks any physical indicator that the delivery fee for the physical item has been paid or will be paid, accessing the electronic digital stamp record, correlating the electronic digital stamp record with the physical item, where the electronic digital stamp record includes the destination information, the delivery fee, a user name, and an indicator of whether a digital stamp associated with the electronic digital stamp record is active, and directing the physical item for delivery according to the destination information when the electronic digital stamp correlates to the physical item, the electronic digital stamp is active, and the delivery fee has been paid. Other embodiments of this aspect include corresponding computer systems, apparatus, and computer programs recorded on one or more computer storage devices, each configured to perform the actions of the methods.

Some implementations may include one or more of the following features. The operations further may include receiving the request from the user to deliver the physical item may include receiving a spoken request from the user, and receiving the destination information may include receiving spoken destination information from the user. Presenting, to the user, the delivery fee for the physical item may include audibly providing the delivery fee using automated speech generation. The physical item includes a written origin address, and where the operations further may include receiving origin information corresponding to the written origin address, computing the delivery fee for the physical item based on the destination information, the origin information, and a weight of the physical item, and generating the electronic digital stamp record using the destination information, the origin information, and the delivery fee. The electronic digital stamp record further includes the weight of the physical item. The operations further may include receiving a weight of the physical item from a scale. Implementations of the described techniques may include hardware, a method or process, or computer software on a computer-accessible medium.

BRIEF DESCRIPTION OF DRAWINGS

The present disclosure will become more fully understood from the detailed description and the accompanying drawings, wherein:

FIG. 7 shows a table illustrating an example of a data structure storing digital stamp information in accordance with aspects of the present disclosure.

DETAILED DESCRIPTION

Figure 1:
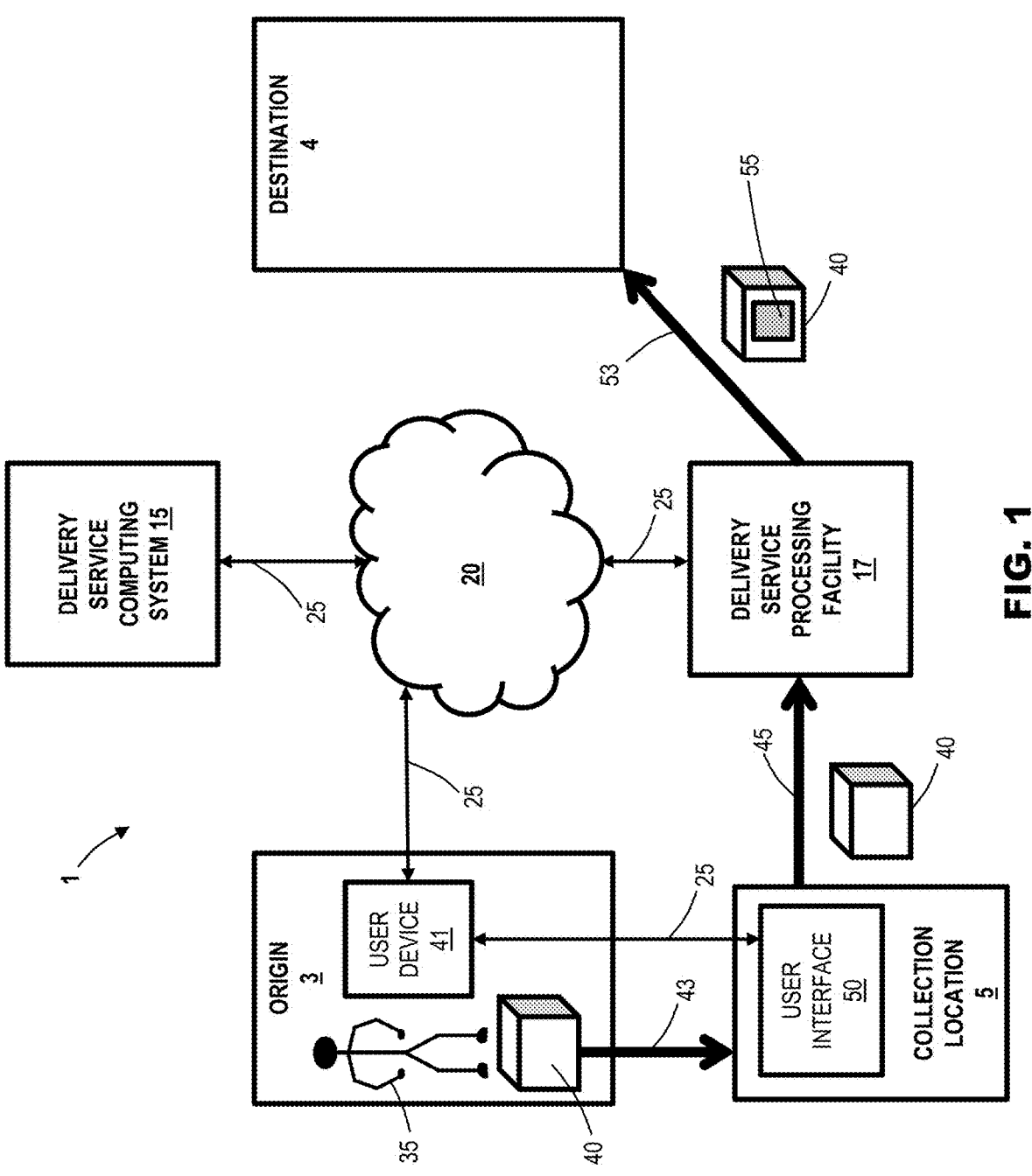
FIG. 1 shows a block diagram illustrating an example of an environment for implementing systems and processes in accordance with aspects of the present disclosure.

The present disclosure relates to the collection and delivery of physical items. Systems and methods in accordance with aspects of the present disclosure allow a sender to deposit an item for delivery at a collection point of a delivery service (e.g., a collection box, such as a mail box) not including physical indicia (e.g., a stamp, marking, code, prepaid shipping label, or other label) indicating that a delivery fee for the item has been paid or will be paid to the delivery service. The sender can pay the delivery fee for the item to the delivery service by obtaining a novel "digital stamp" via a computer-user interface communicatively linked to a computing system of the delivery service. In implementations, the computer-user interface is an intelligent voice-recognition interface that allows the sender to obtain the digital stamp using their voice, and some implementations may be voice-only (i.e., hands-free).

In accordance with aspects of the present disclosure, the delivery service may activate a digital stamp for the sender based on the following information: an origin address, a destination address, a type of delivery, a weight of an item, and a payment indication. In various implementations, the sender has a pre-established account with the delivery service, which stores information including the sender's name, origin address (e.g., the sender's home address), and a method of payment. Thus, in various implementations, the delivery service can activate a digital stamp based solely on the sender providing the destination address, the type of delivery, and the weight of the item. Additionally, in various implementations, the delivery fee for a type of delivery (e.g., a standard envelope or standard package) can be a fixed, preset amount. Thus, in such implementations, the delivery service can activate a digital stamp based solely on the sender providing the destination address and the type of delivery. Further, in various implementations, the account of the user with the delivery service is associated with a phone book or contact list of the user (e.g., an address book on a user device). In such implementations, the delivery service can obtain the delivery address for a recipient's name from the phone book or contact list. Accordingly, in those implementations, the delivery service can activate a digital stamp based solely on the sender providing the recipient's name and the type of delivery requested by the user.

Further, in various implementations, a delivery service may limit the receipt or collection of delivery items to those items corresponding to specific types of deliveries having fixed or predefined delivery fees. For example, a delivery-item collection box can be configured to accept or receive items that conform to a predefined size(s) and shape(s) (e.g., a standard US envelope size A10 (6"×9.5"×¼") or smaller), which have a predefined delivery fee(s) associated with the predefined size(s) and shape(s). For another example, a delivery-item collection box can be configured to accept or receive items that have a specified delivery fee (e.g., the fee for a single first-class postage stamp, which is currently $0.49). Accordingly, in those implementations, the delivery service can activate a digital stamp based solely on the sender providing the recipient's name or nickname (e.g., "Send this letter to Mom") or based on the sender providing the recipient's address, because the amount of the delivery fee will be predetermined based on how and/or where the item was received, accepted, or collected by the delivery service.

In accordance with aspects of the present disclosure, the delivery service collects, processes, and delivers items received from the various senders with or without physical indicia indicating payment of delivery fees (e.g., a postage stamp or a shipping label including payment or account information). In various implementations, after the delivery service collects an item from a collection point, the item can be processed by an automated sorting system that identifies address information on the item (e.g., using optical character recognition (OCR)), determines a weight of the item, and determines whether the item includes a physical indicia indicating payment of delivery fees. If the item lacks any such physical indicia, the automated sorting system may reference, access, or retrieve digital stamp information based on the origin and/or destination address scanned from the item. If the digital stamp information includes an active digital stamp for the item, then the automated sorting system may continue to process the item for delivery. If there is no active digital stamp for the item, then the automated sorting system may identify and route the item for return to the sender.

Reference will now be made in detail to specific implementations illustrated in the accompanying drawings and figures. In the following detailed description, numerous specific details are set forth to provide a thorough understanding of the present teachings. It will be apparent to one of ordinary skill in the art that implementations may be practiced without these specific details. In other instances, well-known methods, procedures, components, circuits, and networks have not been described in detail so as not to unnecessarily obscure aspects of the implementations.

FIG. 1 shows a block diagram illustrating an example of an environment 1 for implementing systems and processes in accordance with aspects of the present disclosure. The environment 1 can include an origin 3, a destination 4, one or more collection locations 5, one or more delivery service computing systems 15, one or more item processing facilities 17, a network 20, and one or more communication links 25. The origin 3 and the destination 4 can be physical places (e.g., a house, an apartment, a school, an office, a building, a retail location, etc.) that have addressable locations (e.g., a street address or a post office box). For example, the locations of the origin 3 and the destination 4 can be specified using the USPS's addressing schema, which identifies locations based on the following: unit or PO Box, street, city, state, and postal code.

The origin 3 can be associated with the user 35 (i.e., a sender) who desires to send a physical item 40 to the destination 4 using a delivery service by physically transporting the item 40 to the collection location 5, as depicted by line 43. The item 40 can be, for example, a letter, a postcard, a package, a box, a container, a crate, or a pallet. In some configurations, the user 35 can label or write onto an external surface of the item 40 with a delivery address for the destination 4 in a computer-readable or computer-recognizable format, such as hand-written or computer-printed alphanumeric characters. The user 35 may also label the external surface of the item 40 with the address of the origin 3 in a computer-readable or computer-recognizable format to provide a return address for the item 40. In accordance with aspects of the present disclosure detailed below, the user may refrain from putting any physical indicia on the external surface of the item indicating that a delivery fee has or will be paid. For example, the user 40 may forgo providing any postage stamp or other shipping label indicating payment for delivery.

In various implementations, the user 35 can have and/or employ a user device 41, which may be a computing device that can communicatively connect (directly or indirectly) to a collection location and/or the delivery service computing system 15 via one or more wired and/or wireless communication links 25. For example, the user device 41 can communicate using a wireless connection (e.g., a Wi-Fi, a BLUETOOTH® and/or a Long-Term Evolution (LTE)) wireless data link). In various implementations, the user device 41 can be a smart phone, an intelligent assistant, a personal computer system, a set top box, a laptop device, a tablet device, or other programmable user electronic device. The user device 41 can include input/output devices conventionally included in such systems for interacting with a user. For example, the user device 41 can include a display, a touch screen interface, a keyboard, a pointing device (e.g., a computer mouse), a microphone, and/or a camera. While the user 35 is shown within the origin 3, this depiction merely represents an association between the origin 3 and the user 35. It is understood that the user 35 can interact with the environment 1 from other locations. For example, the user 35 can interact with the delivery service computing system 15 while outside of the origin 3 and at the collection location 5 or while using the user device 41 at another location remote from the origin 3.

The collection location 5 can be one of numerous predefined locations at which the delivery service collects items that are dropped off for delivery. In various implementations, the collection location 5 can be a mailbox at the origin 3 (e.g., a home mailbox), a collection box at a street-corner or at a business, or a delivery service kiosk at some other location (e.g., a retail location) or the like. After the user 35 physically deposits the item 40 at the collection location, the delivery service can collect the item 40 and physically transport it to the delivery service processing facility 17, as depicted by line 45. In some implementations, the collection location 5 can include a user interface 50, which can be a computerized device or subsystem that interacts with the user 35 to provide delivery-service-related information and services. The user interface 50 can include various input/output devices for interacting with a user, which can be the same as those provided in the user device 41. Thus, in some implementations, the user 35 can interact with the user interface 50 instead of the user device 41. In other implementations, the user device 41 can interact with the user interface 50 via a communication link 25. For example, the user interface 50 can access information and devices provided by the user device 41 (e.g., accessing user authentication components and/or address book information provide by a smartphone). In some embodiments, the functions and processes provided the user interface 50 can be provided through online services. For example, the user 35 could interact with an implementation of the user interface 50 that is not physically located at the collection location 5, but is embodied in software and is provided via a social media platform(s) and Internet messaging services.

The delivery service computing system 15 can be one or more computing devices that provide information and services to the user 35 through the user device 41 and/or the user interface 50. In accordance with aspects of the present disclosure, the delivery service computing system 15 can provide a digital stamp service to the user 35. Further, in various implementations, the delivery service computing system 15 can maintain and provide delivery-service-related information such as collection schedules, delivery service retail hours, delivery service retail office locations and wait times, and the like. While the delivery service computing system 15 is illustrated as a single system, it is understood that the functionality of this system as disclosed herein can be distributed among various systems, which can be operated by multiple entities.

The delivery service processing facility 17 can be a physical plant of the delivery service that receives and processes items (e.g., item 40) transported from various collection locations (e.g., collection location 5) for delivery to various destinations (e.g., destination 4). In implementations, the delivery service processing facility 17 can be a sorting facility that sorts and directs or routes items (e.g., letters and packages) for delivery. The delivery service processing facility 17 can operate one or more automated mail sorting systems that use optical character recognition (OCR) to scan text and codes included on the external surfaces of items, determine address information, and direct or move items for delivery. For example, the delivery service processing facility 17 may receive the item 40 collected by the delivery service from the collection location 5 (as depicted by line 45), process the item 40 to determine its destination, and direct the item 40 for physical transport to the destination 4, as depicted by line 53. In accordance with aspects of the present disclosure, the processing of the item 40 by the delivery service processing facility 17 may include determining that the item 40 lacks any physical indicia on its external surface indicating that a delivery fee has or will be paid, determining that there is an active digital stamp associated with the item 40, and labeling or printing the external surface of the item 40 with information 55 (e.g., a computer-readable or computer-recognizable code, such as a bar code, that is printed on a label that is affixed to the item 40) identifying the digital stamp and/or indicating that the delivery fee for the item 40 has been paid.

The network 20 can be one or more types of communications networks through which the delivery service computing system 15, the delivery service processing facility 17, the user device 41, and/or the user interface 50 can communicate using one or more communication links 25. The communications network 20 can be, for example, the Internet, a wide area network, a local area network, a cellular network, or a peer-to-peer network or any combination thereof. The communication links 25 can be any wired or wireless communication channel or combination thereof. In various implementations, the communication network 20 and/or the communication links 25 can provide secure communications channels between the delivery service computing system 15, the delivery service processing facility 17, the user device 41, and/or the user interface 50, for example, to protect personal and financial information.

Figure 2:
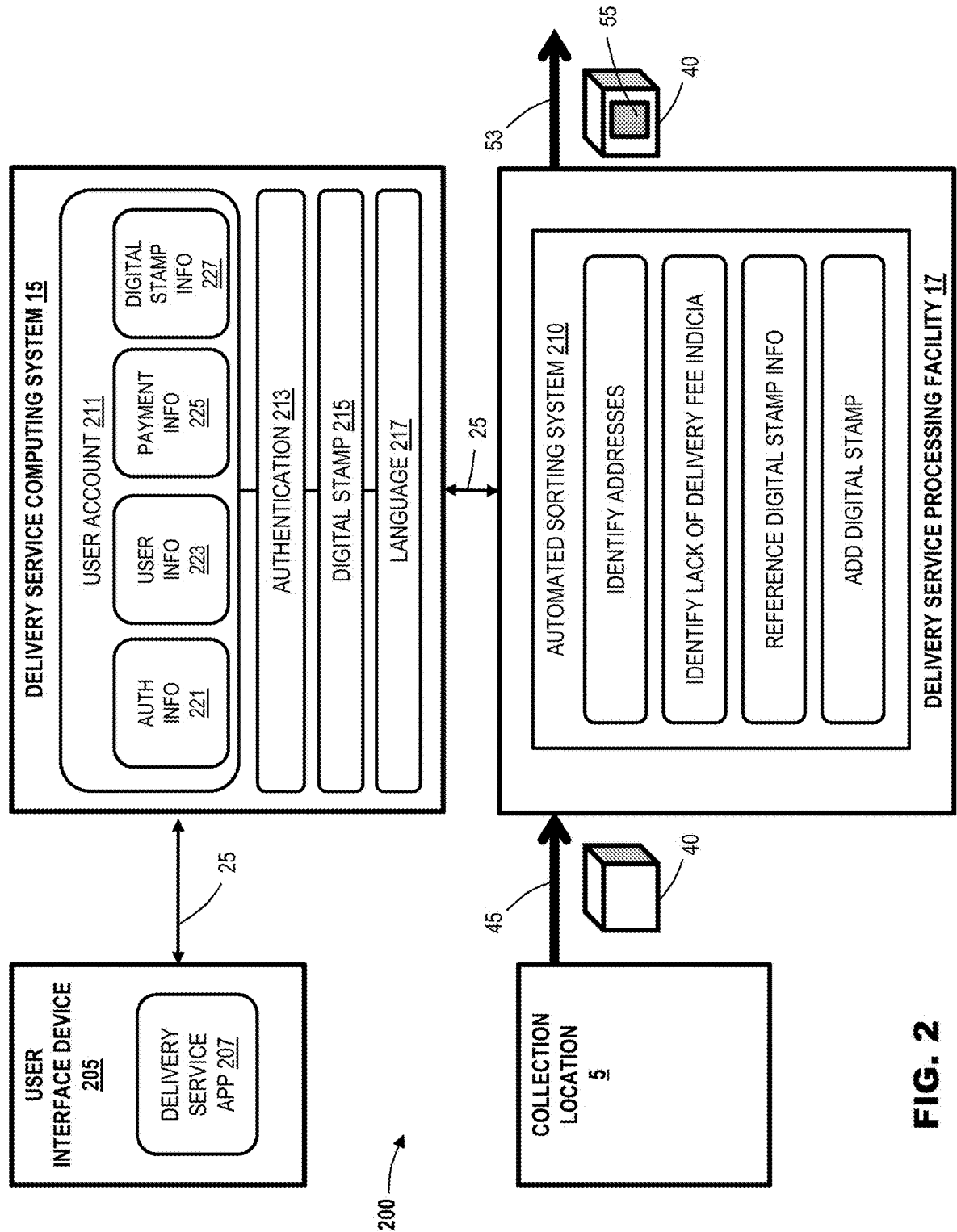
FIG. 2 shows a block diagram illustrating an example of item delivery system in accordance with aspects of the present disclosure.

FIG. 2 shows a block diagram illustrating an example of a system 200 in accordance with aspects of the present disclosure. The system 200 includes a collection location 5, a delivery service computing system 15, a delivery service processing facility 17, and communication links 25, all of which can be the same or similar to those described above. Additionally, the system 200 includes a user interface device 205, which can be the same or similar to the user device (e.g., user device 41) or the user interface (e.g., user interface 50) previously described herein.

The user interface device 205 can be a computing device including hardware and/or software that provides a computer-user interface (e.g., a natural language interface and/or graphic user interface) through which the user 105 can exchange information with, and obtain services from, the delivery service computing system 15. The information can include text (e.g., keyboard inputs, login information, and documents) and information that is convertible into text (e.g., spoken words, hand gestures, and images). The user interface device 205 may include and execute a delivery service application 207, which can provide other services in operation with the user device 205, such as authentication of the identity of the user 35 (e.g., biometric), secure payment of delivery fees and the like (e.g., credit or debit card information), address book services (e.g., access to a contact list or electronic phonebook), and location services (e.g., mapping). In various implementations, the user interface device 205 may be an intelligent computing device that uses artificial intelligence, natural language processing, language translation, and voice generation to interact with users, such as described in, as described in copending U.S. patent application Ser. No. 15/850,432 titled "Intelligent Collection Box," filed 21 Dec. 2017, which is incorporated herein by reference in its entirety.

As shown in the example of FIG. 2, the delivery service computing system 15 can include one or more modules that perform various functions and processes disclosed herein, including a user account module 211, an authentication module 213, a digital stamp module 215, and a language module 217. The user account module 211 can be hardware and/or software executed by the delivery service computing system 15 that establishes and maintains various types of information associated with users (e.g., user 35), including authentication information 221, user information 223, payment information 225 and digital stamp information 227. The authentication information 221 can be information that identifies an individual user. For example, the authentication information 221 can include a username and passcode. Additionally, in various implementations, the authentication information 221 can include biometric information, such as voice authentication data that identifies a user based solely on their voice, e.g., when speaking a specific word or phrase, (which is also known as "voice recognition" and "speaker recognition"). The user information 223 can include names, addresses, and account identifiers (e.g., account numbers) for the users. For example, the address information can include an address of a user (e.g., user 35) at their home or place of business (e.g., origin 3). Additionally, the user information 223 can include the address information for various destinations associated with the user. For example, the destination addresses associated with a user can be maintained in an address book that is stored on the user interface device 205 and/or the delivery service computing system 15. The payment information 225 can be the account information of, for example, a credit card, a debit card, an electronic payment service, a prepaid account, etc. that is supplied by the user. The digital stamp information 227 can be information describing digital stamps purchased by the user. For example, the digital stamp information 227 can include a data structure or data set (e.g., a database), which contains digital stamp record(s), which contain the following information: a digital stamp identifier, a user account number, a user name, a delivery type, an origin address, a destination address, a delivery fee, an activation date, an expiration date, an indicator that payment of the delivery fee was successful, and an indicator of whether a digital stamp is active (e.g., unused, used, expired, or unexpired).

The authentication module 213 can be hardware and/or software executed by the delivery service computing system 15 that authenticates the identities of users based on the authentication information 221. In implementations, the authentication module 213 receives or accesses authentication credentials (e.g., a user name and/or a passcode) provided by the user 35 using, e.g., the user interface device 205 and compares the received credentials to the pre-established credential information stored in authentication information 221. Additionally, in various implementations, the authentication module 213 can be or include a voice authentication service that identifies a user based on a word or a phrase spoken by the user into the user interface device 205. For example, the authentication service 221 can include an application program interface (API) that accesses a remote processing system the provides voice authentication to the delivery service computing system 15 using a software-as-a-service ("SAAS") model (e.g., TRULYSECURE™ BY SENSORY, INC. of Santa Clara, California).

The digital stamp module 215 can be hardware and/or software executed by the delivery service computing system 15 that interacts with the user interface device 205 to generate, maintain, and provide the digital stamp information 227. As described in detail below, the digital stamp module 215 can interact with a user who is using the user interface device 205 via, for example, the delivery service application 207. The digital stamp module 215 can interact with the user to generate, create, revise, or otherwise determine the digital stamp information 227 for a particular digital stamp (e.g., including determining information such as the user account number, the user name, the delivery type, the origin address, the destination address, and/or the delivery fee). Some of the information for the digital stamp can be pre-established before a digital stamp is created on behalf of the user. For example, the user account number, user name, and origin address can be stored as the part of the user information 223, which is created and stored when the user initially creates his or her user account using the user account module 211. Additionally, the destination address can be obtained from an address book maintained by the user interface device 205 and/or with the user information 225.

The language module 217 can be hardware and/or software executed by the delivery service computing system 15 that can use natural language speech or text as inputs and outputs. The user can communicate with the delivery service computing system 15 (including the user account module 211, the authentication module 211, and the digital stamp module 215) using various user input devices that are part of or subsystems of the user interface device 205, such as keyboard, mouse, touchscreen display, and/or a microphone and a speaker. In various implementations, the natural language module 217 can use various services (SAAS) for interpreting and responding to requests from the users, including a voice detection and authentication service, a speech recognition and generation service, a language translation service, a natural language processing service, and an artificial intelligence service (e.g., CLOUD SPEECH API™ and CLOUD NATURAL LANGUAGE API by ALPHABET INC. of Mountain View, California, AMAZON AWS by AMAZON.COM, INC. of Seattle, Washington, and API.AI by SPEAKTOIT, INC of Palo Alto, California). Such services can use libraries particularly adapted to recognize and use delivery-service-related words, phrases, locations, and services.

While modules 211-217 are illustrated as separate units, it is understood the two or more of the modules 211-217 can be combined. It is also understood that the functionality of the modules 211-217 can be divided into additional units. Further, even though the modules 211-217 are depicted together, it is understood that one or more of the modules 211-217 can be located at different locations (e.g., different servers linked by network 20 and/or communication links 25).

Additionally, FIG. 2 depicts the user interface device 205, the delivery service computing system 15 and the delivery service processing facility 17 as separate units, connected by communication links 25, it is understood that the functionality of two or more of these units can be combined. For example, in implementations, some or all of the functionality of the user interface device 205 can be incorporated into the delivery service computing system 15. Additionally, in some implementations, the delivery service computing system 15 and the delivery service processing facility 17 can be combined into a single system and/or location.

In an example of an interaction in accordance with aspects of the present disclosure, a user can request a digital stamp for the item 40 by activating the delivery service application 207 on the user interface device 205. For example, in an implementation in which the user interface device 205 is included with a collection location (e.g., a USPS Blue Box or some other delivery service kiosk), the user can start the process by speaking a trigger phrase, such as "Hello Box," which is received (e.g., recorded) by the user interface device 205 and transmitted to the delivery service computing system 15 in a format that is usable by the delivery service computing system 15. The delivery service computing system 15 can recognize the trigger phrase (e.g., using the language module 217) and authenticate or enable authentication of the identity of the user (e.g., using the authentication module 213 and authentication information 221). For example, the delivery service application 207 can authenticate the identity of the user/sender by, for example, using voice authentication based on a voice authentication key stored in the authentication information 221 and provided to the delivery service application 207 by the delivery service computing system 15. Additionally or alternatively, the delivery service application 207 can authenticate the user by comparing a username and passcode input by the user using user interface devices (such as a display, keyboard, mouse, and/or touchscreen) to the username and passcode stored in the authentication information 221.

Using the user interface device 205, the user can request that the delivery service computing system 15 provide a digital stamp for an item 40 to be delivered to a particular destination (e.g., destination 4). For example, using an interactive voice interface, the user can speak, "I would like to send this package to my mother using a digital stamp." The digital stamp module 215 of the delivery service computing system 15 can receive the sender's request from the user interface device 205 via the communication link 25. The delivery service computing system 15 can interpret the request using the language module 217 and, based on the user identification by the authentication service, the digital stamp module 215 can retrieve or access the user information 223 stored by the user account module 211, including the user's name and origin address, as well as a name and the destination address corresponding to an address book entry identified to the user's "mother." Additionally, the digital stamp module 215 can obtain a weight of the item 40 (e.g., using a scale provided by the user interface device 205 or based on an input from the sender/user). For example, using the language module 217, the digital stamp module 215 can request that the user place the item 40 on a scale included in the user interface device 205. Based on the weight, the user may select a delivery option from various types offered by the digital stamp service 214. The digital stamp service 214 can calculate a delivery free based on the selected delivery type, item weight and destination, and obtain the user's authorization to charge the delivery fee and activate the digital stamp for the item 40. The digital stamp service 214 can also calculate or determine other information for the digital stamp, including an activation date and an expiration date. The digital stamp module 214 can store a record for the digital stamp in the digital stamp information 227, which can include the user name, the delivery type, the origin address, the destination address, the delivery fee, the activation date, the expiration date, a payment indicator, and an indicator that the digital stamp is active. Using the user interface device 205, the digital stamp module 215 can also prompt the user to drop off the item 40, labeled with the origin address and the destination address, at a collection location 5 or schedule a pickup of the item 40. At this point, in accordance with aspects of the present disclosure, the item 40 lacks any physical indicia that the delivery fee for the item has been or will be paid; e.g., there is no postage stamp or prepaid shipping label or the like on the item 40.

The delivery service can collect the item 40 from the collection location 5 and physically transport the item 40 (as depicted by line 45) to a delivery service processing facility 17, which may include an automated sorting system 210. The automated sorting systems 210 can be a computerized system including hardware and software that performs the functions of a mail sorting system, including orienting items (e.g., arranging them to face upright), scanning items for proper addresses, scanning items for indicia of delivery fees (e.g., a postage stamp or a shipping label including payment or account information), marking the indicia of delivery fees as canceled and sorting the items for delivery to different destinations using various delivery types and modes of transport.

In accordance with aspects of the present disclosure, the sorting system 210 can determine that the item 40 lacks any physical indicia that the delivery fee for the item has been or will be paid. In some configurations, such an item 40 would be sorted out of the delivery stream into a "do not deliver/ return to sender" processing stream. The sorting system 210 can attempt to identify digital stamp information 227 for the item 40. For example, the sorting system 10 may query the digital stamp information 227 based on the origin address and/or the destination address scanned from the item 40. If the digital stamp information 227 lacks a record of a digital stamp for the item 40 or if the digital stamp information includes a record, but the digital stamp is not active or paid, then the automated sorting system 210 may identify the item 40 to be returned to the sender for failing to pay the delivery fee. If the digital stamp information 227 indicates that a digital stamp for the item 40 is currently active and paid, then the automated sorting system 210 may sort the item 40 for delivery to its destination (as indicated by line 53). Additionally, the sorting system 210 may optionally add a physical indicia 55 (e.g., a barcode) to the item 40 indicating that the delivery fee has been paid and/or identifying the digital stamp for the item (e.g., a code associated with the digital stamp).

Figure 3:
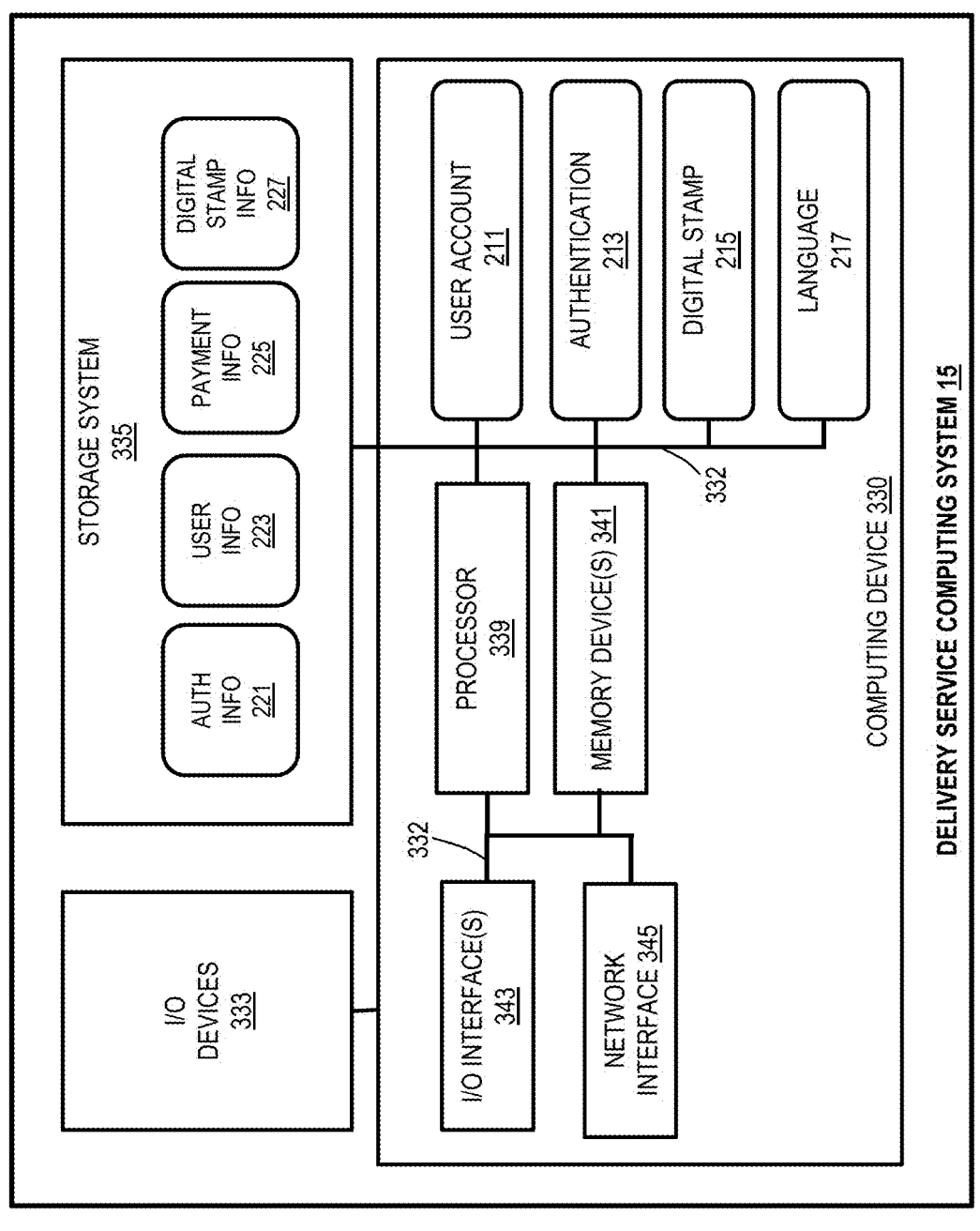
FIG. 3 shows a block diagram illustrating an example of a delivery service computing system in accordance with aspects of the present disclosure.

FIG. 3 shows a flow block diagram illustrating an example of a delivery service computing system 15, which can be the same or similar to that described above. In some implementations, the delivery service computing system 15 may be a server computer. The delivery service computing system 15 includes hardware and software that perform various processes and functions disclosed herein. In implementations, the delivery service computing system 15 includes a computing device 330, input/output (I/O) devices 333, and a storage system 335.

The I/O devices 333 can include any sensor, communication or user-input device that enable the computing device 230 to monitor its environment, communication with one or more other computing devices using any type of communications link, interact with a user 105, and interact with the computing device 330. In implementations, the I/O devices 333 can include user-input device(s) (e.g., touchscreen, pointer device, keyboard) a display (e.g., a computer monitor and/or touch screen display).

The storage system 335 can include one or more computer-readable, non-volatile hardware storage device that stores information and program instructions. For example, the storage system 335 can be one or more flash drives and/or hard disk drives. In accordance with aspects of the present disclosure, the storage device 335 stores authentication information 221, user information 223, payment information 225, and digital stamp information 227, which can be the same or similar to those previously described herein.

In embodiments, the computing device 333 includes a processor 339 (e.g., microprocessor, microchip, or application-specific integrated circuit), one or more memory devices 341 (e.g., RAM and ROM), one or more I/O interfaces 343, and one or more network interfaces 345. The memory device 341 can include a local memory (e.g., a random access memory and a cache memory) employed during execution of program instructions. Additionally, the computing device 330 includes at least one communication channel 332 (e.g., a data bus) by which it communicates with the I/O devices 333 and the storage system 335.

The processor 339 executes computer program instructions (e.g., an operating system and/or application programs or module), which can be stored in the memory device 341 and/or the storage system 335. The processor 339 can also execute the computer program instructions of user account module 211, an authentication module 213, a digital stamp module 215, and a language module 217, which can be the same or similar to those previously disclosed herein. It is noted that the computing device 330 can comprise any general-purpose computing article of manufacture capable of executing computer program instructions installed thereon (e.g., a personal computer, server, etc.). The computing device 330 is representative of various possible equivalent-computing devices that can perform the processes described herein. To this extent, in embodiments, the functionality provided by the computing device 330 can be any combination of general and/or specific purpose hardware and/or computer program instructions. In some configurations, the program instructions and hardware can be created using standard programming and engineering techniques, respectively.

Figure 4:
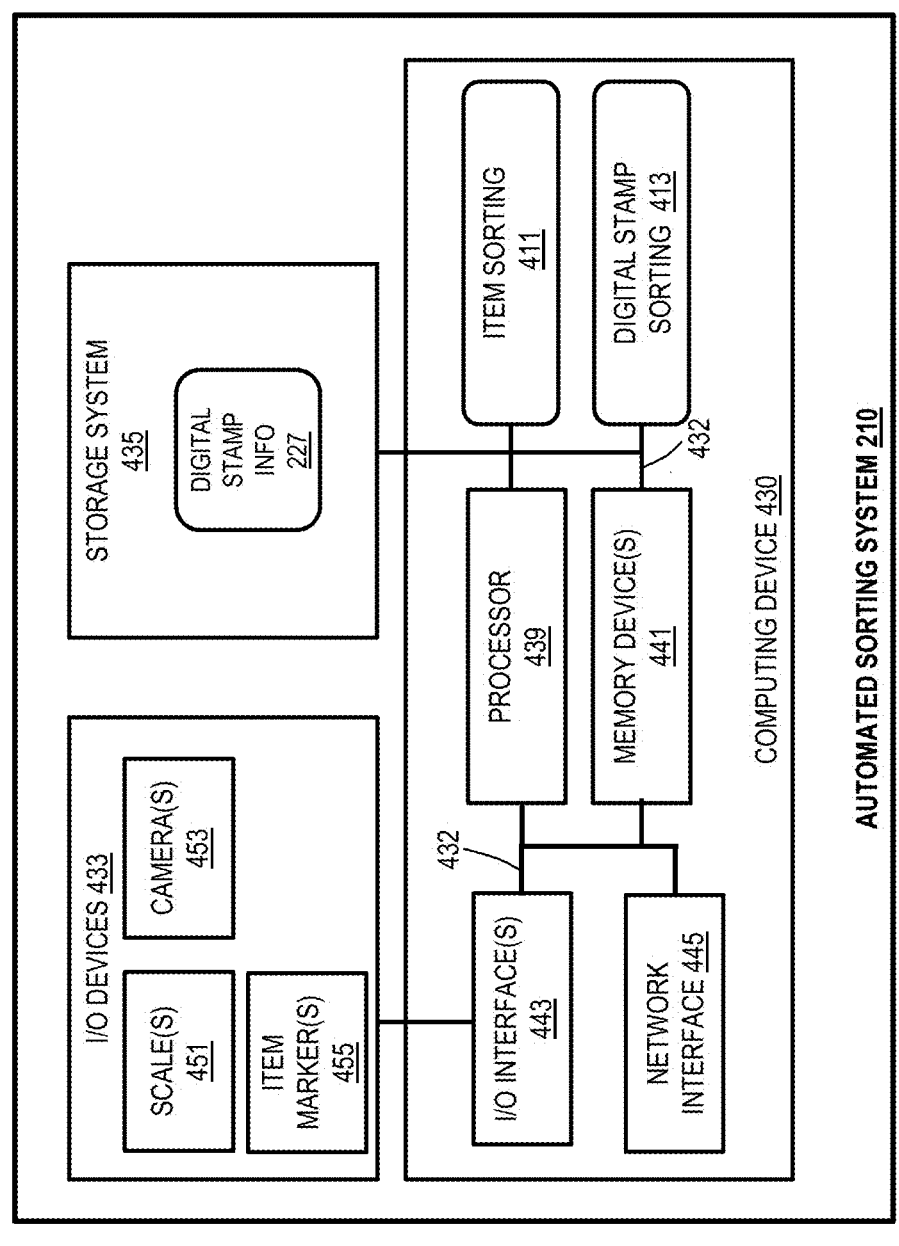
FIG. 4 shows a block diagram illustrating an example of an automated sorting system in accordance with aspects of the present disclosure.

FIG. 4 shows a flow block diagram illustrating an example of an automated sorting system 210, which can be the same or similar to that described above. The automated sorting system 210 includes hardware and software that perform various processes and functions disclosed herein. In implementations, the automated sorting system 210 includes a computing device 430, input/output (I/O) devices 433, and a storage system 435, communication channels 432, I/O interfaces 443, network interface 445, processor 439, memory devices 441, which can be the same or similar to those previously described above.

The automated sorting system 210 can include and/or be operably connected to various devices and mechanisms for orienting, moving, and sorting items for delivery, including letters, postcards, and packages. In accordance with aspects of the present disclosure, examples of I/O devices 433 include in, connected to, and or controlled by the automated sorting system can include one or more scales 451, one or more cameras 453 and one or more item markers 455. The scale 451 can determine a weight of items (e.g., item 40) processed by the automated sorting system 411. The camera 453 can detect items processed by the automated sorting system 411 and capture images of the external surfaces of the items for optical character recognition of addresses and the like and for reading barcodes. The item marker 455 can place (e.g., spray, print, or draw) computer-readable codes (e.g., barcodes), computer-recognizable text, and other marks (e.g., postage cancellation marks) on to the external surfaces of items processed by the automated sorting system 411.

The processor 439 executes computer program instructions (e.g., an operating system and/or application programs or module), which can be stored in the memory device 441 and/or the storage system 445. The processor 439 can also execute the computer program instructions of an item sorting module 411 and a digital stamp sorting module 413. The item sorting module 411 can be software, hardware, or a combination thereof that controls the operations of the automated sorting system 210. In accordance with aspects of the present disclosure, the operations can include orienting items for processing (e.g., placing the external surfaces of the items including address information in substantially the same direction), determining weights of the items using the one or more scales 451, capturing address and delivery fee information from the external surfaces of the items using the one or more cameras 453, interpreting the captured images to determine address and/or delivery fee information (e.g., using optical character recognition), marking the items using the item marker 455 (e.g., to cancel stamps or add digital stamp indicia), and controlling equipment that sorts and moves the items for delivery to various destinations based on the captured address information and delivery fee information.

The digital stamp sorting module 413 can be software, hardware, or a combination thereof that processes digital stamps in accordance with aspects of the present disclosure. As detailed herein, if the item sorting module 411 scans an item (e.g., item 40) for delivery fee information and determines that the item lack any physical indicia of payment of delivery fees, the digital stamp sorting module 413 can generate a digital stamp query for the item including the origin address and/or the destination address determined by the item sorting module 411. In implementations, the digital stamp sorting module 413 can query digital stamp information 227, which can be the same as that describe above. In the implementation shown, a copy of the digital stamp information 227 can be maintained at automated storing system 210. In other implementations, the digital stamp information 227 can be stored and maintained at a remote system (e.g., delivery service computing system 15). In such implementations, for example, the digital stamp sorting module 413 can send the query to the delivery service computing system 15 via a computer network (e.g., network 25) using the network interface 445. Based on the digital stamp information 227, the automated sorting system 210 can determine whether or not a digital stamp is active for the item. In the case where an active digital stamp is found, the digital stamp sorting module 413 may communicate an authorization message to the item sorting module 411 to continue sorting the item. Additionally, the authorization can include a digital stamp identifier, which the sorting module 411 may, in some embodiments, mark on the item using the item markers 455. If the digital stamp sorting module 413 determines that that no digital stamp is active for the item, then the digital stamp sorting module 413 may communicate a cancelation message to the item sorting module 411, which causes it to direct, route, or move the item for return to its origin address due to insufficient/no postage.

Figure 5:
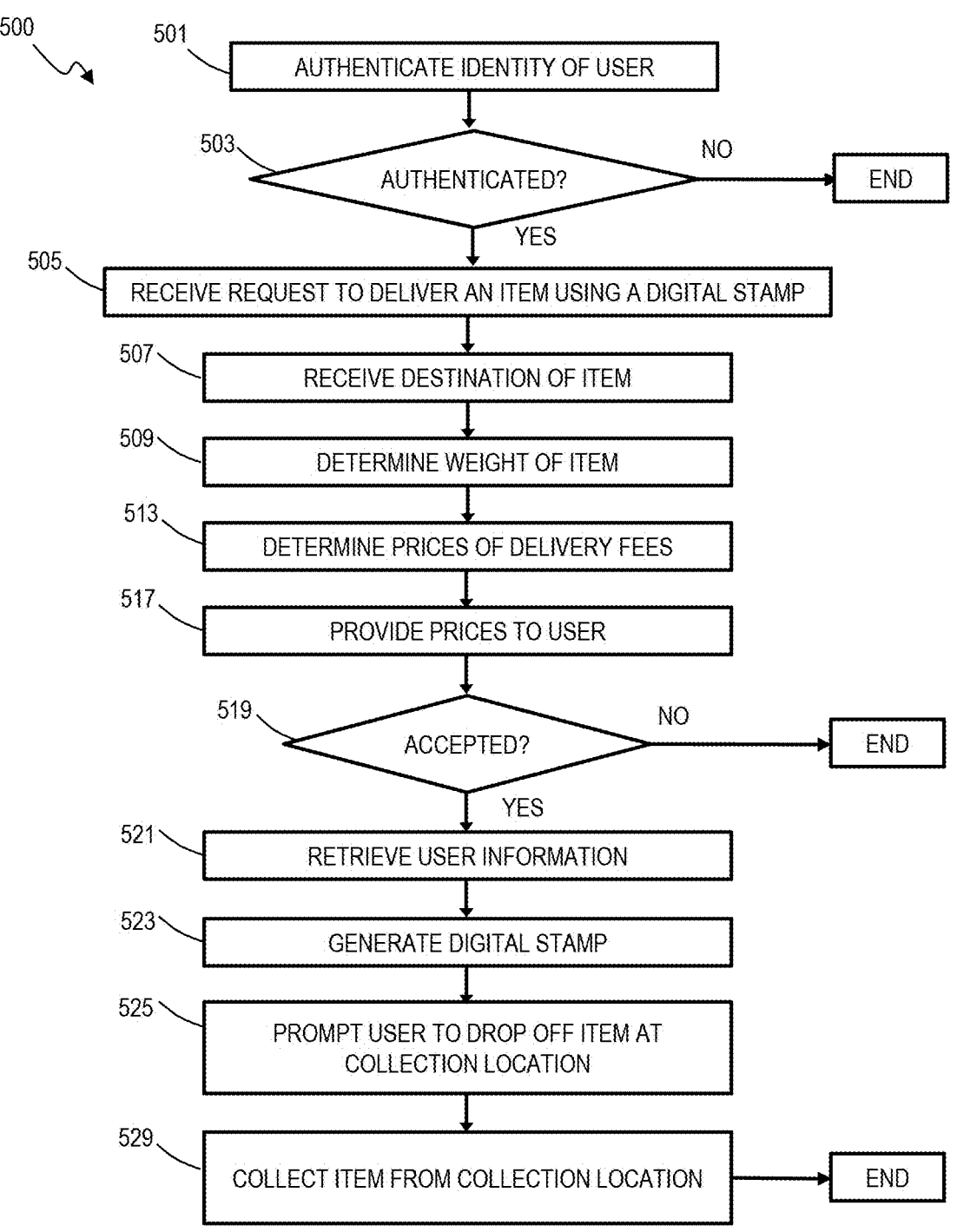
FIG. 5 shows a flow block diagram illustrating an example of a process for activating a digital stamp for an item in accordance with aspects of the present disclosure.
Figure 6:
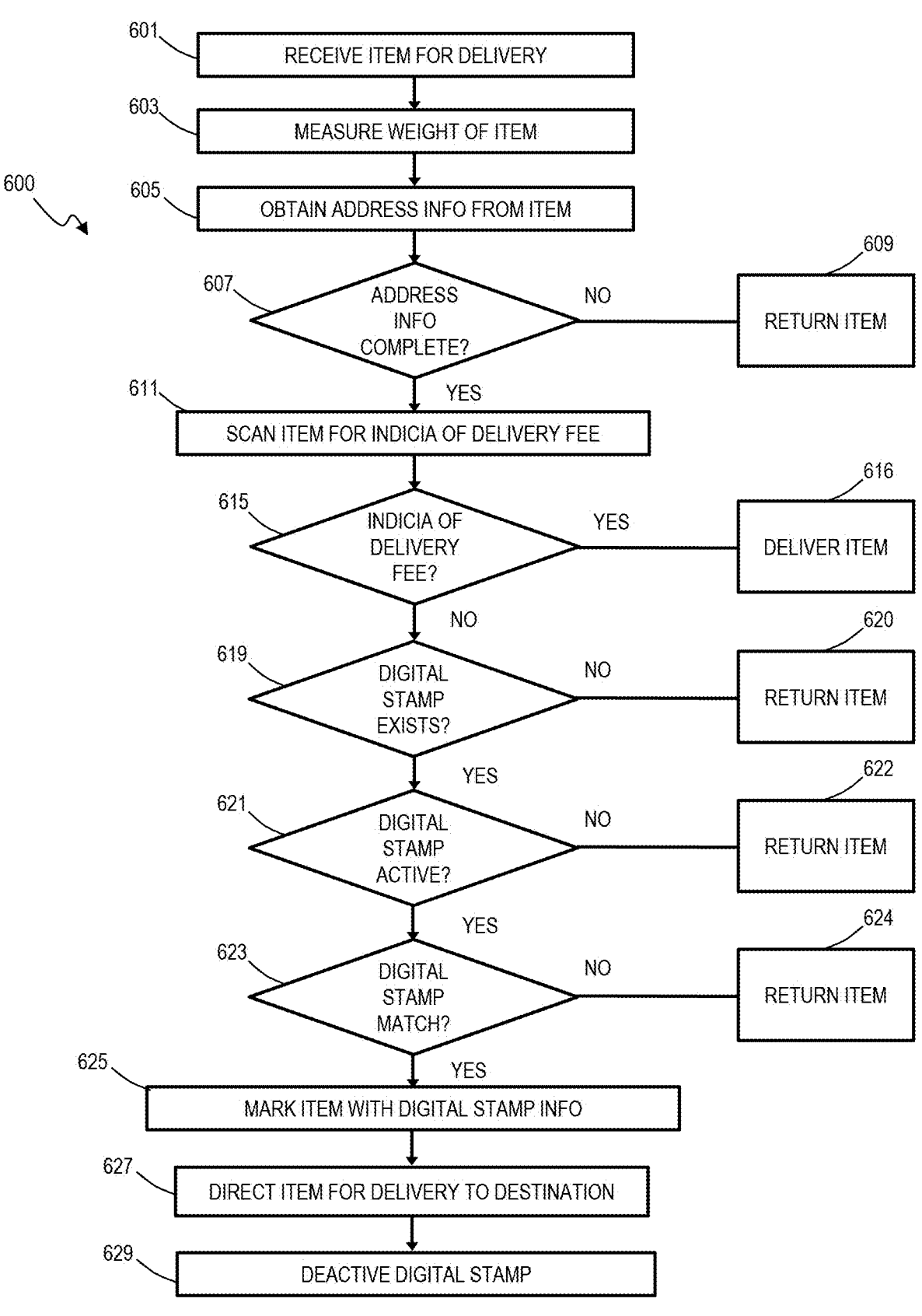
FIG. 6 shows a flow block diagram illustrating an example of a process for processing an item using a digital stamp in accordance with aspects of the present disclosure.

The flow diagrams in FIGS. 5 and 6 illustrate examples of the functionality and operation of possible implementations of systems, methods, and computer program products according to various implementations in accordance with the present disclosure. The blocks in the flow diagrams of FIGS. 5 and 6 can represent modules, segments, or portions of program instructions, which can include one or more computer executable instructions for implementing the illustrated functions and operations. In some alternative implementations, the functions and/or operations illustrated in a particular block of the flow diagram can occur out of the order shown in FIGS. 5 and 6. For example, two blocks shown in succession can be executed substantially concurrently, or the blocks can sometimes be executed in the reverse order, depending upon the functionality involved. It will also be noted that the blocks of the flow diagram and combinations of blocks in the block can be implemented by special purpose hardware-based systems that perform the specified functions or acts, or combinations of special purpose hardware and computer instructions.

FIG. 5 shows a flow block diagram illustrating an example of a process 500 for activating a digital stamp for an item in accordance with aspects of the present disclosure. At 501, a delivery service system (e.g., delivery service computing system 15) authenticates the identity of a user (e.g., user 35) based on pre-established authentication information (e.g., authentication information 221). In some implementations, the system can perform authentication by comparing a user identification key (e.g., password) input by the user to information stored in a pre-established account for that user (e.g., user account 211). Also, in some implementations, the intelligent collection box can authenticate the user via a user device (e.g., biometric authentication via fingerprint and/or facial recognition by a smartphone), where the identity of the user device is associated with the pre-established account for that user. Further, in some implementations, the intelligent collection box can authenticate using voice authentication, which is also known as speaker recognition or voice recognition. In accordance with aspects of the present disclosure, the authentication information is associated with user information (e.g., user information 223) and payment information (e.g., payment information 225) for the user (e.g., which was previously supplied by the user when establishing the user account 211. Accordingly, the process 500 may retrieve or access these various information sources to authenticate the user and to activate a digital stamp for the user.

At 503, the system determines whether or not the user was authenticated at 501. If the user is not authenticated at 501 (i.e., 503 is "No"), the process 500 ends. If the user is authenticated at 501(i.e., 503 is "Yes"), then the system can further interact with the user to provide delivery services and information. In various implementations, this interaction can be spoken. For example, the system (e.g., using user interface device 205) can acknowledge the user and offer assistance by audibly announcing, for example, "Hello. How can I help you?" or the like. The user can then interact with the system by asking it almost any delivery service-related question, for example, as described in copending U.S. patent application Ser. No. 15/850,432 titled "Intelligent Collection Box," filed 21 Dec. 2017.

In the example shown at 505, the system can receive a request from the user to deliver an item (e.g., item 40) using a digital stamp. For example, using speech recognition and/or a manual input device (e.g., keyboard), the user can input the request for a digital stamp to the user interface device. In various implementations, this input can be spoken. For example, the user may state aloud, "I would like to send a letter to my mother using a digital stamp."

At 507, the system can receive a destination (e.g., destination 4) of the item from the user. For example, using computer-generated speech and/or a video display, the system can prompt the user to input the destination address that is (or will be) labeled on the item. In some implementations where the process 500 has access to an address list of the user, the process 500 can access the address list, retrieve a home address corresponding to the user's "mother," and ask the user to confirm the address. The user can also input the destination address via a user input device or select the destination address from a display showing the user's address book. Additionally, in various implementations, the input prompts and other interactions can be spoken. For example, the system may prompt the user by audibly asking, for example, "Please tell me the destination address."

At 509, the system determines a weight of the item. For example, using computer-generated speech and/or a video display, the system can prompt the user to place the item on a scale included in the user interface device, at which time the system can automatically record the weight measured by the scale. In other implementations (e.g., in which the user interface device lacks a scale), the system can prompt the user to input or provide the weight of the item (e.g., via spoken words or by a manual input device).

At 513, the system can determine one or more delivery fees or prices for delivering the item. In some implementations, the system can use the weight determined at 509 to determine one or more delivery service types that are available to deliver the item and their corresponding different rates, including, for example, priority delivery, first class delivery, overnight delivery, second day delivery, parcel post delivery, etc. For example, the system can determine the delivery fees using one or more predefined tables for the different available delivery types that associate a delivery fee with a weight and/or a destination. At 517, the system box can provide the user with the delivery fees determined at 513. For example, using computer-generated speech and/or a video display, the system can indicate or present one or more available delivery service types and corresponding prices determined at 513.

At 519, the system can determine whether the user accepted one of the prices provided at 517. For example, using computer-generated speech and/or a video display, the system can prompt the user to input their acceptance of one of the delivery types and receive the response of the user via a user input/output device. If the user does not accept the price (i.e., does not agree to pay a delivery fee) (i.e., 519 is "No"), then the process 500 ends. If the user accepts a price provided at 519 (i.e., 519 is "Yes"), then at 521 the system can retrieve additional information for the digital stamp from user account information (e.g., user information 223). For example, the system can retrieve the user's name, the origin address, and payment information. At 523, the system can generate a digital stamp for the item, using the destination information determined at 507, the weight determined at 509, and/or the type of delivery accepted at 519. Additionally, in implementations, the system may charge the user the accepted delivery fee at the time the digital stamp is generated. For example, the system may charge the account of the user using the payment information (e.g., payment information 225). Generating the digital stamp can include storing a record for the digital stamp in a data file or database containing digital stamp information (e.g., digital stamp information 227). The digital stamp information included in the record can be or include a digital stamp identifier (e.g., possibly a code), the destination determined at 507, the weight determined at 509, the type of delivery accepted at 519, a user identifier (e.g., user name and/or account number), an origin address, an activation date, an expiration date, and/or an indicator of whether a digital stamp is active (e.g., unused and unexpired). The activation date can be the current date on which the digital stamp is generated. The expiration date can be a predetermined amount of time after the creation date (e.g., one week).

At 525, the system can prompt the user to drop off the item at a collection location (e.g., collection location 5). For example, using computer-generated speech and/or a video display, the system can instruct the user to label the item with the origin address and the destination address (if not done already) and deposit the item at a collection box or mailbox. In accordance with aspects of the present disclosure, the item can be dropped off without any physical indicia indicating that the delivery fee has been or will be paid. At 529, the delivery service can collect the item from the collection location and transport the item for sorting (e.g., by automated sorting system 210) and delivery to its destination (e.g., destination 4).

FIG. 6 shows a flow block diagram illustrating an example of a process 600 for processing delivery items that have digital stamps associated with them in accordance with aspects of the present disclosure. At 601, a delivery service processing facility (e.g., delivery service processing facility 5) can receive an item (e.g., item 40) for which the delivery fee has been paid or will be paid using a digital stamp. The delivery service processing facility may direct items for different types of delivery services (e.g., first class vs. overnight) to different processing lines or streams. The type of delivery may be marked on the item when received or the delivery service processing facility may determine the type of delivery after it is received. In accordance with aspects of the present disclosure, at the time it is received, the item may lack any such physical indicia of its type of delivery service or the payment of its delivery fee.

At 603, a system (e.g., automated sorting system 210) may weigh and orient the item to be upright and faced for further processing. For example, the item may be oriented such that an upper surface including address information is faced in a direction accessible by downstream processing elements (e.g., movers, sorters, and optical character recognition (OCR) cameras). At 605, the system scans the item to obtain address information. For example, using one or more cameras (e.g., cameras 453) and OCR processing, the system captures and image of the item and determines an origin address and destination address on the upper surface of the item and at 607, can determine whether the address information is complete. The address information may be deemed complete if the destination address includes information to identify an address of a particular destination (e.g., unit number, street name or PO Box, and postal code). The system can determine how complete the information is by comparing address information scanned from the item with a predefined schema specifying elements (e.g., fields) of the address information. Additionally, the system can compare the content of the address information to reference address information to confirm that the content corresponds to an actual location.

If the address information scanned at 605 is determined to be incomplete at 607 (i.e., 607 is "No"), then at 609 the system can classify the item as an item to be returned to the sender and route or sort it accordingly. If the address information scanned at 605 is determined to be complete at 607 (i.e., 607 is "Yes"), then at 611 the system scans the item for physical indicia of a delivery fee. For example, the system may use the one or more cameras and the OCR processing to obtain an image of the item and identify any stamps, barcodes, shipping labels, or the like indicating payment of the delivery fee. At 615, the automated processing system determines whether the item includes a proper physical indicia of delivery fee. The indicia of delivery can be determined to be proper if it is present for the type of delivery and based on the weight determined at 603.

If the indicia of delivery fee scanned at 611 is determined to be complete and proper at 615 (i.e., 615 is "Yes"), then at 616 the system sorts the item for deliver in the usual manner. If the indicia of delivery fee scanned at 611 is determined to be incomplete (e.g., not present) at 615 (i.e., 615 is "No"), then at 619, the system determines whether a digital stamp for the item exists, e.g., the digital stamp created by the user (e.g., user 35) that is sending the item. For example, the system can obtain digital stamp information for the item (e.g., digital stamp information 227) from the delivery service (e.g., delivery service computing system 15) or from a storage location within the sorting system. For example, the automated processing system (e.g., executing digital stamp sorting module 413) can identify the digital stamp information for the item using the address information obtained from the item at 605.

If the system determined that a digital stamp does not exist for the item at 619 (i.e., 619 is "No"), then at 620 the system can classify the item as to be returned to the origin address on the item and further sort and route the item accordingly. If the system determined that a digital stamp exists for the item at 619 (i.e., 619 is "Yes"), then at 621 the system determines whether digital stamp identified at 619 is active. In various implementations, the digital stamp may be active for a limited time (e.g., three days) after being created by the user. The activation date and/or the expiration date can be stored in association with the digital stamp. Accordingly, the system can determine whether the digital stamp is active by comparing the activation date and the expiration date to a current date. Additionally, in various implementations, the digital stamp requested by the user may be activated only after payment of the associated delivery fee is received. For example, the digital stamp will not be activated if the user requests the digital stamp but the user's payment information (e.g., payment information 225) is incorrect or if the payment is rejected by a bank or payment service. If at 621 the system determines that the digital stamp is inactive (i.e., 621 is "No"), then at 622 the system can identify or classify the item as to be returned to the origin address on the item and further sort and route the item accordingly.

If at 621 the system determines that there is active digital stamp (i.e., 621 is "Yes"), then at 623 the system may determine whether the information obtained from the item substantially matches the information associated with the digital stamp. For example, the digital stamp may be associated with information including a weight, a user name, a delivery type, an origin address, and/or a destination address. The system may compare some or all of this information to a type of delivery designated for the item received at 601, the weight measured at 603, and/or the address information obtained at 605.

If the information of the digital stamp does not match or substantially match the information obtained from the item (e.g., different weight, which may include a tolerance range, different origin address, or different destination addresses) (i.e., 623 is "No"), then at 624 the system can determine that the item is not the correct item intended for the digital stamp, and can identify or classify the item as to be returned to the origin address on the item and further sort and route the item accordingly. If at 623 the system determines that the information of the digital stamp substantially matches the information obtained from the item (i.e., 623 is "Yes"), then at 625 the system may mark the item with physical indicia that the delivery fee has been paid. For example, the automated processing system can mark the item with a code (e.g., a sprayed-on bar code) or other information that identifies or otherwise corresponds to the digital stamp identified at 619. If the item is later processed by another sorting system, (e.g., after being moved to another sorting facility on the way to its delivery destination), then that sorting system may recognize the code that was applied to the item at 625 as being valid physical indicia of payment of the delivery fee, and process the item. At 627, the automated processing system can sort and deliver the item. And finally, at 629, the automated processing system can update the digital stamp information corresponding to the item to deactivate the digital stamp.

In some implementations, marking the item with a code corresponding to the digital stamp (625) may not be performed, and deactivating the digital stamp (629) may not be performed, until after the item passes through its last sorting system before being delivered to its final destination or until after the item is delivered to its final destination. In such implementations, the sorting system that processes the item enroute may perform the processing of 615-623.

FIG. 7 shows a table illustrating an example of a data structure for storing digital stamp information 227 in accordance with aspects of the present disclosure. The digital stamp information 227 can be the same or similar to that previously described herein. The digital stamp information 227 can include a number of records associating digital stamps 705A, 705B, having respective information for a digital stamp, including an identifier code 707, a weight 709, a user name 711, a delivery type 713 selected by the user, an origin address 715, a destination address 717, a fee paid indicator 719, a creation date 721, an expiration date 723, and an active indicator 725. The identifier code 707 may be an identifier for the digital stamps 705. In various implementations, the identifier code 707 may be marked on an item (e.g., item 40) by a delivery service (e.g., by an automated sorting system 210) after it determines that a particular digital stamp 705 is active by referring to the active indicator 725. (E.g., FIG. 6, 625.) The weight 709 can represent the weight of the item provided by the respective user 711 or measured by a user interface device (e.g., user interface device 205) when the digital stamp 705 is requested. (E.g., FIG. 5, 509.) The user 711 and the origin address 715 can be a name and address of the user who requested the digital stamp 705. (E.g., FIG. 5, 505.) The user 711 and the origin address 715 can be automatically obtained from user information (user information 223) associated with a user account (user account 211). (E.g., FIG. 5, 521) The destination address 715 can be provided by the user or obtained from an address list when the digital stamp 705 is requested. (E.g., FIG. 5, 507.) The fee paid indicator 719 can indicate whether the payment for the delivery fee for the item (e.g., FIG. 5, 517 and 519) has been received or approved from a bank or payment service. The creation date

721 can be the date the digital stamp was generated. (E.g., FIG. 5, 523). The expiration date can be a date the digital stamp 705 expires. In various implementations, the expiration date 723 can be calculated based on the creation date 721. For example, the digital stamps 705 may expire three days after the creation date 721. The active indicator 725 can indicate whether the digital stamp 705 is currently active. The value of the active indicator 725 (e.g., "Yes" or "No") can be determined based on the feed paid indicator 719 and/or the expiration date 723.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited by the terms of the appended claims, along with the full scope of equivalents to which such claims are entitled. It is also to be understood that the terminology used herein is for the purpose of describing examples of implementations, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. The use of such phrases should not be construed to imply that the introduction of a claim recitation by the indefinite articles "a" or "an" limits any particular claim containing such introduced claim recitation to embodiments containing one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

The invention claimed is:

1. A system for creating and using an electronic digital stamp record, the system comprising:

a user interface including a processor executing instructions to perform operations comprising:

receiving a request from a user to deliver a physical item to a destination using the electronic digital stamp record, wherein the physical item includes a written destination address;

accessing destination information corresponding to the written destination address;

presenting to the user a delivery fee for the physical item that is computed based on the destination information;

receiving an acceptance of the delivery fee; and prompting the user to place the physical item at a collection location; and an item sorting module executing instructions to perform operations comprising:

generating the electronic digital stamp record using the destination information and the delivery fee;

obtaining an image of the physical item including the destination information;

determining, based on the image, that the physical item lacks any physical indicator that the delivery fee for the physical item has been paid or will be paid;

correlating the electronic digital stamp record with the physical item, wherein the electronic digital stamp record includes the destination information, the delivery fee, a user name, and an indicator of whether a digital stamp associated with the electronic digital stamp record is active; and automatically controlling equipment that sorts and moves the physical item for delivery according to the destination information when the electronic digital stamp correlates to the physical item, the electronic digital stamp is active, and the delivery fee has been paid.

2. The system of claim 1, wherein receiving the request from the user to deliver the physical item comprises:

receiving a spoken request from the user; and receiving the destination information comprises receiving spoken destination information from the user.

3. The system of claim 1, wherein presenting, to the user, the delivery fee for the physical item comprises:

audibly presenting the delivery fee using automated speech generation.

4. The system of claim 1, wherein the physical item comprises:

a written origin address, wherein the operations further include:

receiving origin information corresponding to the written origin address;

computing the delivery fee for the physical item based on the destination information, the origin information, and a weight of the physical item; and generating the electronic digital stamp record using the destination information, the origin information, and the delivery fee.

5. The system of claim 4, wherein the electronic digital stamp record comprises:

the weight of the physical item.

6. The system of claim 1, wherein presenting the delivery fee for the physical item comprises:

presenting to the user a plurality of delivery service types and a corresponding delivery fee for the delivery service type, wherein receiving the acceptance of the delivery fee comprises receiving, from the user, the acceptance of one delivery service type and the corresponding delivery fee from among the plurality of delivery service types.

7. The system of claim 1, wherein the operations further comprise:

receiving a weight of the physical item from a scale that is operably connected to the system.

8. A computer implemented method for creating and using an electronic digital stamp record, the method comprising:

receiving a request from a user to deliver a physical item to a destination using the electronic digital stamp record, wherein the physical item includes a written destination address;

accessing destination information corresponding to the written destination address;

presenting, to the user, a delivery fee for the physical item that is computed based on the destination information;

receiving an acceptance of the delivery fee;

prompting the user to place the physical item at a collection location;

generating the electronic digital stamp record using destination information and the delivery fee;

obtaining an image of the physical item including the destination information;

determining, based on the image, that the physical item lacks any physical indicator that the delivery fee for the physical item has been paid or will be paid;

correlating the electronic digital stamp record with the physical item, wherein the electronic digital stamp record includes the destination information, the delivery fee, a user name, and an indicator of whether a digital stamp associated with the electronic digital stamp record is active; and automatically controlling equipment that sorts and moves the physical item for delivery according to the destination information when the electronic digital stamp correlates to the physical item, the electronic digital stamp is active, and the delivery fee has been paid.

9. The method of claim 8, wherein receiving the request from the user to deliver the physical item comprises receiving a spoken request from the user, and receiving the destination information comprises receiving spoken destination information from the user.

10. The method of claim 8, wherein presenting, to the user, the delivery fee for the physical item comprises:

audibly providing the delivery fee using automated speech generation.

11. The method of claim 8, wherein the physical item includes a written origin address, and further comprising:

receiving origin information corresponding to the written origin address;

computing the delivery fee for the physical item based on the destination information, the origin information, and a weight of the physical item; and generating the electronic digital stamp record using the destination information, the origin information, and the delivery fee.

12. The method of claim 11, wherein the electronic digital stamp record comprises:

the weight of the physical item.

13. The method of claim 8, wherein presenting the delivery fee for the physical item comprises:

presenting to the user a plurality of delivery service types and a corresponding delivery fee for the delivery service type, wherein receiving the acceptance of the delivery fee comprises receiving, from the user, the acceptance of one delivery service type and the corresponding delivery fee from among the plurality of delivery service types.

14. The method of claim 8, further comprising:

receiving a weight of the physical item from a scale.

15. A non-transitory computer readable media including instructions for creating and using an electronic digital stamp record, wherein the instructions, when executed by a processor, perform operations comprising:

receiving a request from a user to deliver a physical item to a destination using the electronic digital stamp record, wherein the physical item includes a written destination address;

accessing destination information corresponding to the written destination address;

presenting, to the user, a delivery fee for the physical item that is computed based on the destination information;

receiving an acceptance of the delivery fee;

prompting the user to place the physical item at a collection location;

generating the electronic digital stamp record using the destination information and the delivery fee;

obtaining an image of the physical item including the destination information;

determining, based on the image, that the physical item lacks any physical indicator that the delivery fee for the physical item has been paid or will be paid;

correlating the electronic digital stamp record with the physical item, wherein the electronic digital stamp record includes the destination information, the delivery fee, a user name, and an indicator of whether a digital stamp associated with the electronic digital stamp record is active; and automatically controlling equipment that sorts and moves the physical item for delivery according to the destination information when the electronic digital stamp correlates to the physical item, the electronic digital stamp is active, and the delivery fee has been paid.

16. The non-transitory computer readable media of claim 15, wherein the operations further comprise:

receiving the request from the user to deliver the physical item comprises receiving a spoken request from the user; and receiving the destination information comprises receiving spoken destination information from the user.

17. The non-transitory computer readable media of claim 15, wherein presenting, to the user, the delivery fee for the physical item comprises:

audibly providing the delivery fee using automated speech generation.

18. The non-transitory computer readable media of claim 15, wherein the physical item includes a written origin address, and wherein the operations further comprise:

receiving origin information corresponding to the written origin address;

computing the delivery fee for the physical item based on the destination information, the origin information, and a weight of the physical item; and generating the electronic digital stamp record using the destination information, the origin information, and the delivery fee.

19. The non-transitory computer readable media of claim 18, wherein the electronic digital stamp record further includes the weight of the physical item.

20. The non-transitory computer readable media of claim 15, wherein the operations further comprise:

receiving a weight of the physical item from a scale.

\* \* \* \* \*